March 6, 1945.  J. W. FITZ GERALD  2,370,649
ENGINE STARTER
Filed May 7, 1942  2 Sheets-Sheet 2
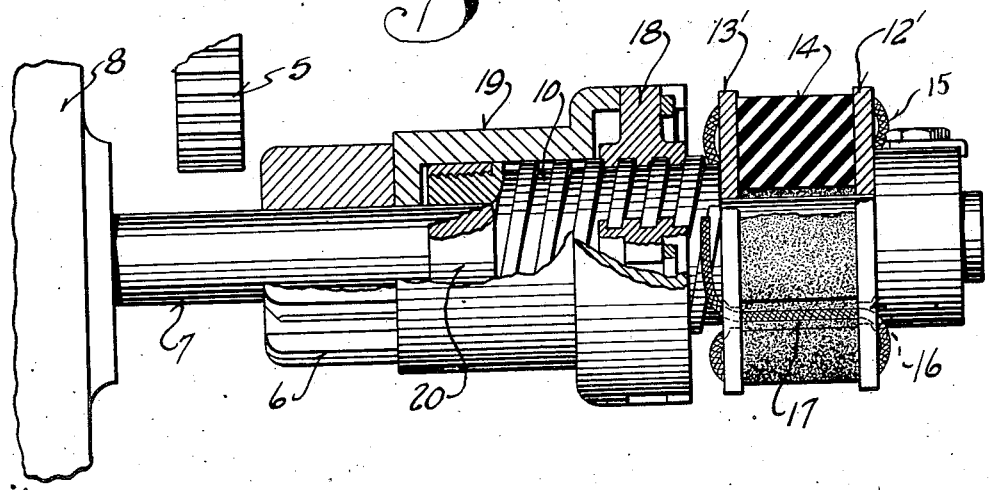
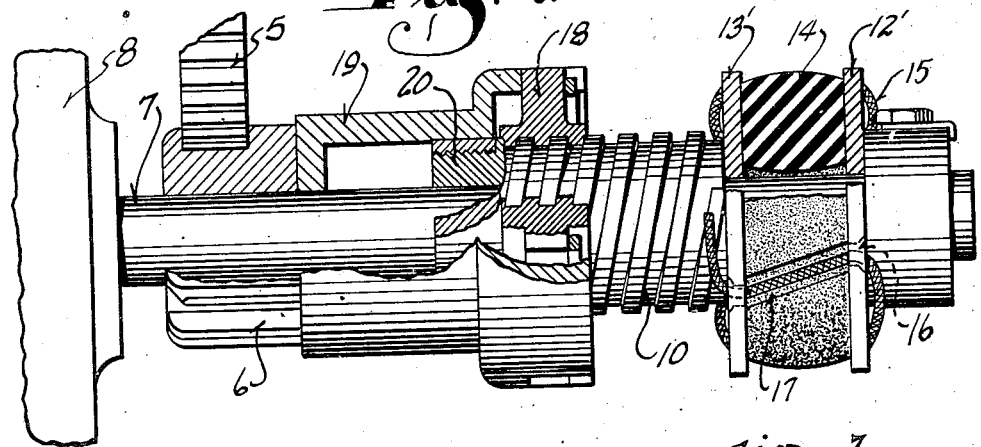
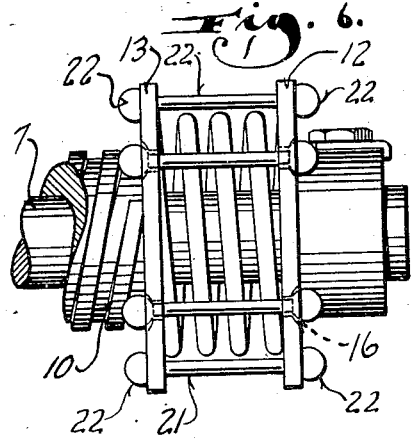
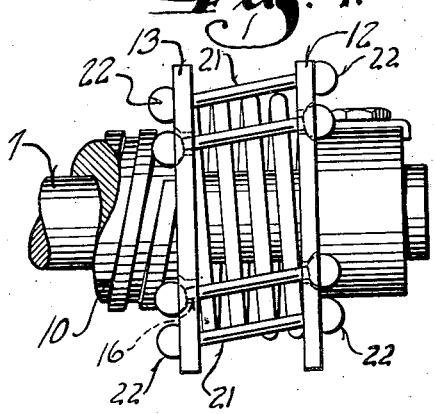
Inventor
John W. Fitz Gerald
By
Attorney Patented Mar. 6, 1945

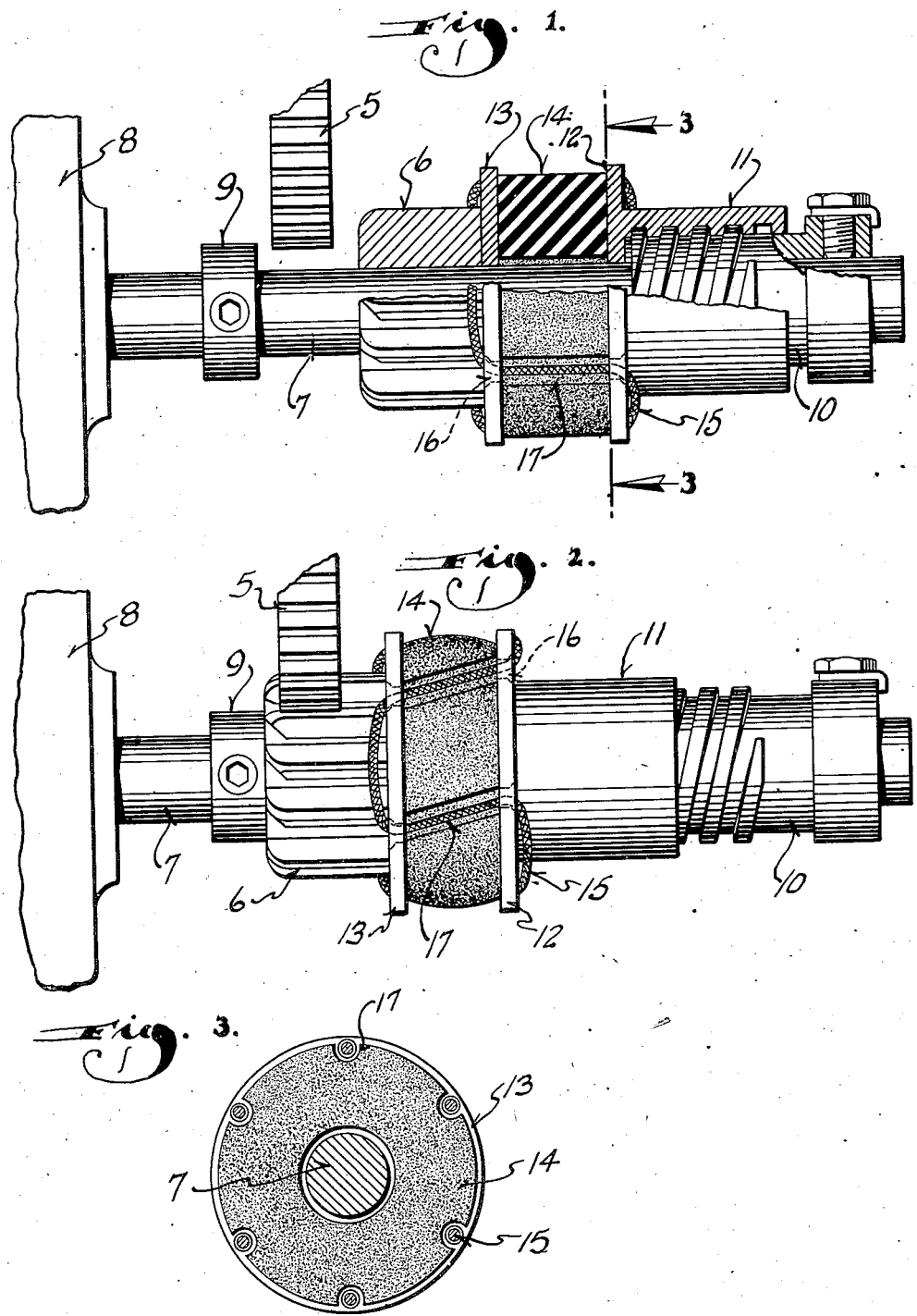

2,370,649

UNITED STATES PATENT OFFICE 2,370,649

ENGINE STARTER

John W. Fitz Gerald, Milwaukee, Wis., assignor to Briggs & Stratton Corporation, Milwaukee, Wis., a corporation of Delaware Application May 7, 1942, Serial No. 442,055

6 Claims. (Cl. 74—7)

This invention relates to engine starters and refers particularly to engine starters of the type wherein the pinion is automatically propelled into and out of mesh with the ring gear of an engine.

As is well known to those skilled in the art, it is essential in starters of this character that the transmission of torque to the pinion be resilient not only to cushion the application of torque to the engine, but also to accommodate misalignment between the teeth of the pinion and ring gear.

Many different schemes have been employed to provide this necessary resiliency and the present invention is likewise directed to this feature.

In the conventional "Bendix" starter, which was in widespread use until a few years ago, resiliency was obtained through the use of a spring having both endwise and torsional resiliency. The entire torque was carried through this spring and as a consequence spring breakage was frequent.

The substitution of a rubber annulus for the spring as employed in the starter illustrated in Patent No. Re. 20,686, issued to John W. Fitz Gerald April 5, 1938, overcame the objections to the early use of springs in the "Bendix" starters, but the permanent set which the rubber took when the starter was in use for some time, led to difficulty.

In constructions like that of the aforesaid Fitz Gerald reissue patent the torque is transmitted through frictional engagement between the rubber annulus and the driving and driven abutments or flanges between which the annulus is confined. These flanges, in constructions like that of the aforesaid reissue patent are on the screw threaded actuator and the motor shaft. Hence, in taking up the load when the pinion is fully meshed and up against its fixed stop, the actuating member is forced back by the action of the screw threads. This enhances or increases the frictional grip between the rubber and the driving and driven flanges as is desired, but it also subjects the rubber to severe compression which in time causes the rubber to take a permanent set.

Inasmuch as the flanges or abutments between which the rubber is confined are held against spreading in those constructions by an outer shell having a fixed axial or longitudinal length, as soon as the rubber begins to take a permanent set the friction prevalent between the rubber and the driving and driven flanges when the starter is at rest is inadequate to insure initial torque transmission from the driving to the driven abutment and as a result the motor shaft merely spins without effecting engagement of the pinion with the ring gear.

The present invention, therefore, has as one of its objects to provide an exceedingly simple but sufficiently positive manner of insuring torque transmission, notwithstanding a permanent set of the rubber, and which in nowise interferes with the functioning of the means through which the resiliency is obtained.

More specifically it is an object of this invention to provide a novel resilient coupling for use in engine starters which is so constructed that the flanges or abutments between which the rubber annulus is confined are held together by tension members to insure torque transmission from one to the other at all times without altering the manner in which the rubber annulus functions.

In any starter wherein the action of the screw threads imparts an end thrust on the resilient member during the cranking operation, only rubber or a similar material having cubical elasticity can be employed to provide the necessary resiliency. A compression spring is out of the question for the reason that the small space available does not permit the use of a spring heavy enough to carry the load.

If the end thrust produced by the screw could be eliminated a spring could be employed to provide the necessary resiliency; but if the spring carries the torque, all the objections inherent in the early "Bendix" starters are encountered.

With this in mind the present invention contemplates as another of its objects the provision of a starter so designed that the screw action does not produce an end thrust, and wherein the necessary resiliency both endwise and torsional is achieved through endwise compression of a cushion member which may be a rubber annulus or a compression spring.

Stated more specifically it is a further object of this invention to provide a starter of the character described wherein the resilient element, either a rubber annulus or a compression spring, is placed only in endwise compression during the operation of the starter and wherein the driving and driven elements of the resilient coupling have a degree of limited relative rotary motion cushioned by endwise compression of the resilient element so that the taking up of the load by the starter is properly cushioned.

It is also an object of this invention to provide a starter so designed and constructed that the customary fixed pinion stop is eliminated and instead a stop mounted on the screw shaft upon which the pinion is threaded serves to define the operative position of the pinion.

With the above and other objects in view, which will appear as the description proceeds, this invention resides in the novel construction, combination and arrangement of parts substantially as hereinafter described and more particularly defined by the appended claims, it being understood that such changes in the precise embodiment of the hereindisclosed invention may be made as come within the scope of the claims.

The accompanying drawings illustrate several complete examples of the physical embodiment of the invention constructed according to the best modes so far devised for the practical application of the principles thereof, and in which:

Figure 1 is a side view of a starter embodying this invention with a part thereof broken away and in section and showing the pinion retracted or disengaged from the ring gear;

Figure 2 is a view similar to Figure 1 but showing the pinion advanced into mesh with the ring gear and under load;

Figure 3 is a cross sectional view through Figure 1 on the plane of the line 3—3;

Figures 4 and 5 are views similar to Figures 1 and 2 illustrating the application of this invention to a slightly different form of starter; and Figures 6 and 7 are side views of the yieldable driving connection per se illustrating the use of a compression spring in lieu of the rubber annulus and a different type of tension means for tying the driving and driven abutments together.

Referring now particularly to the accompanying drawings in which like numerals indicate like parts, the numeral 5 designates the ring gear of an engine to be started with which a pinion 6 is automatically engaged and disengaged during the operation of the starter.

The pinion 6 is mounted on a power shaft 7 driven from the starter motor 8, to be freely movable longitudinally and rotarily thereon.

In that embodiment of the invention illustrated in Figures 1, 2, and 3, when the pinion is in its fully meshed position as shown in Figure 2, it engages a fixed stop 9 on the power shaft. This power shaft has a screw 10 fixed thereon upon which a nut 11 is threaded.

The nut 11 and the pinion 6 have axially spaced opposed driving and driven abutments 12 and 13 respectively. These abutments are preferably in the form of flanges suitably secured to the nut and pinion and have a cushioning member or spacer therebetween. The cushioning member or spacer therebetween. The cushioning member or spacer is an annulus 14 of rubber or other similar material having cubical elasticity.

The abutments 12 and 13 are tied together by a cable 15 laced through holes 16 in their peripheral portions with the ends of the cable suitably secured together. Preferably, though not necessarily, the cable is received in longitudinal grooves 17 formed in the periphery of the spacer.

In operation, as will be readily apparent, upon starting of the motor 8 and revolution of the power shaft, the inertia of the connected pinion and nut holds the same against revolving so that the action of the screw threads advances the pinion forwardly into mesh with the ring gear and until the pinion strikes the stop 9.

In the event of accidental misalignment of the teeth on the pinion and ring gear, endwise resiliency to cushion such abutment of the teeth is afforded by the elastic spacer 14.

The elastic spacer or cushion member also provides the necessary resiliency for cushioning the application of the engine load on the starter. As the load is taken up the screw action forces the nut 11 forwardly towards the then axially immovable pinion and places the rubber annulus axially in compression before the pinion begins to turn. This increases the frictional grip between the flanges and the rubber so that the torque is divided between the rubber and the cable lengths tying the flanges together.

The tension ties between the abutments are parallel with the starter axis when the starter is at rest so that relative rotary motion of the abutments as the load of the engine is picked up angularly displaces the tension ties and draws the flanges together against the elasticity of the spacer 14. It is to be noted that the tension ties at all times insure transmission of torque so that even though the rubber may take a permanent set, the functioning of the starter will not be impaired thereby.

In that embodiment of the invention shown in Figures 4 and 5, the structure of the resilient driving connection is the same as that shown in Figures 1 and 2. Its location in the torque transmitting chain leading from the power shaft to the pinion is different though, and as a result certain very desirable advantages are attained:

First, the stop for the pinion may be placed on the screw shaft which overcomes one of the objectionable features of starters of this general type heretofore in use; and, second, a compression spring may be employed in lieu of the rubber annulus if desired.

In this embodiment of the invention the resilient coupling is located between the screw 10 which constitutes the actuating member and the power shaft. One of the flanges 12' is carried by a collar fixed to the shaft 7 and the other flange 13' is fixed to the screw 10. The rubber annulus 14 is confined between these flanges by the tension ties provided by the cable.

The pinion travels along the shaft 7 and is propelled to and from operative position meshing with the ring gear by relative rotation between the screw 10 and a nut 18 fixed to a pinion sleeve 19. The pinion sleeve 19 is of a diameter to slidably receive the screw and is enlarged at its outer end where the nut 18 is attached to it.

When the pinion reaches its operative position fully meshed with the ring gear the nut 18 strikes the stop 20 fixed to the end of the screw, but as will be readily apparent, when this occurs there is no screw action placing end thrust on the rubber annulus. Instead, the screw and pinion in effect merely become one unit so that rotation of the screw is momentarily restrained until the load of the engine is overcome and the cranking operation begins.

During this interval between meshing of the pinion and the beginning of the cranking operation, the flange 12' revolves with respect to the flange 13' inasmuch as the tension ties between them do not positively restrain such relative rotation. However, upon such relative rotation taking place, the tension ties are displaced angularly and as a consequence the flanges 12' and 13' are drawn together against the elasticity of the annulus 14. In this manner the annulus 14 through merely endwise resiliency cushions the application of the engine load on the starter motor.

It is to be observed that the force drawing the flanges 12' and 13' together is maximum at the instant relative rotation between the flanges begins and diminishes as the angle between the tension ties and the flanges approaches zero. It is thus possible to utilize a spring in lieu of the rubber annulus for even the initial end thrust imposed on the resilient member in this embodiment of the invention is not nearly as great as the thrust imposed on the elastic body in constructions where the action of the screw applies the thrust as in the embodiment of the invention shown in Figures 1, 2 and 3.

Figures 6 and 7 illustrate the use of a compression spring in lieu of the rubber annulus. In addition, these views show a different form of tension tie. Rods 21 passing through aligned apertures in the marginal portions of the flanges are substituted in this instance for the cable.

These rods have bulbous enlargements 22 seated in sockets in the outer faces of the flanges to accommodate the relative rotary motion of the flanges during operation of the starter, as clearly illustrated in Figure 7.

From the foregoing description, taken in connection with the accompanying drawings, it will be readily apparent to those skilled in the art that the starter construction provided by this invention has many advantages when applied either in its embodiment illustrated in Figures 1 to 3, inclusive, or when employed in the manner shown in Figures 4 to 7, and that by obviating the need for a pinion stop fixed with relation to the motor shaft which was previously necessary to have the screw action provide the pressure required to insure friction adequate to carry the torque load, a compression spring may be employed in lieu of the rubber annulus where desired.

What I claim as my invention is:

1. In an engine starter of the type wherein a pinion, through a threaded connection with a screw member, is automatically propelled to and from mesh with an engine ring gear upon rotation of the screw member with respect to the pinion: an axially and rotarily yieldable driving connection through which the torque to the pinion is transmitted comprising driving and driven abutments; an elastic spacer confined between the abutments to yieldingly resist axial movement thereof toward each other; and a flexible cable laced through apertures in the abutments near their peripheries tying the abutments together with the elastic spacer interposed therebetween.

2. In an engine starter of the type wherein a pinion is automatically propelled to and from mesh with an engine ring gear by rotation of a threaded actuator driven from a power shaft: a driving connection through which the torque to the pinion is yieldingly transmitted, and by which the pinion shifting pressure is partially relieved in the event of pinion tooth interference, said driving connection comprising opposed axially spaced driving and driven abutments, said abutments being relatively movable rotarily and axially with respect to each other; a resilient cushion interposed between said abutments to yieldingly resist axial movement thereof toward each other; and tension members connecting said abutments at points spaced radially out from the axis of the starter, the resilient cushion tending to hold said tension members parallel to the axis of the starter and at right angles to the abutments so that relative rotary motion of the driving and driven abutments and consequent angular displacement of the tension members draws the abutments toward each other against the opposition of the resilient cushion to relieve end pressure on the pinion teeth in the event of endwise abutment of the pinion and ring gear teeth during meshing and to cushion the application of the starting torque to the engine.

3. In an engine starter of the type wherein a pinion, through a threaded connection with a screw member, is automatically propelled to and from mesh with an engine ring gear upon rotation of the screw member with respect to the pinion: an axially and rotarily yieldable driving connection through which the torque to the pinion is transmitted, and by which the pinion shifting pressure is partially relieved in the event of pinion toooth interference, comprising spaced driving and driven abutments relatively movable rotarily and axially with respect to one another; an elastic spacer confined between the abutments to yieldingly resist axial movement thereof toward each other; and a plurality of tension members connected to the abutments near their peripheries to tie the abutments together with the elastic spacer interposed therebetween, said tension members being so disposed that relative rotation of the abutments causes the tension members to draw the abutments together against the opposition of the elastic spacer and thereby relieve end pressure on the pinion teeth in the event of pinion tooth interference and cushion the application of the starting torque.

4. In an engine starter of the character described: a power shaft; a screw fixed to the power shaft; a pinion freely movable on the power shaft both axially and rotarily; a nut member threaded on the screw; axially opposed abutments fixed to the pinion and nut member; an annular elastic spacer between the abutments; and tension means having a fixed axial length tying the abutments together with the spacer confined therebetween, said spacer and tension means permitting relative rotary motion between the abutments, and said tension means drawing the abutments toward each other against opposition of the elastic spacer, whereby pinion tooth interference is relieved by rotary and disengaging motion of the pinion.

5. In an engine starter of the type wherein a pinion is automatically advanced to and retracted from mesh with an engine ring gear by relative rotation between it and a threaded screw mounted on and driven from a power shaft; a driving connection through which the torque to the pinion is transmitted, said driving connection comprising opposed axially spaced driving and driven abutments relatively rotarily and axially movable with respect to each other, the driven abutment being connected with the pinion for axial and rotative propulsion thereof; a resilient cushion interposed between said abutments to yieldingly hold the same axially spread apart; and parallel link connections between said abutments making equal angles with the abutments and producing parallel approach of one abutment to the other in consequence to relative rotary motion of the abutments, whereby pinion advancing end pressure is relieved and the pinion is rotarily adjusted for meshing, upon pinion tooth interference.

6. In an engine starting automatic pinion shifting device of the type wherein a pinion is propelled to and from mesh with an engine ring gear by relative rotation between it and a threaded actuator driven from a power shaft: a driving head securable to a power shaft and through which the starter is secured with relation to the ring gear; a driving connection through which the torque derived from the driving head must pass to reach the pinion, said driving connection comprising axially spaced driving and driven abutments; a resilient cushion interposed between said abutments to hold the same axially spaced, the spacing between said abutments being a factor in the overall distance between the driving head and the forward ends of the pinion teeth so that reduction in said spacing is effective to reduce end pressure on the pinion teeth in the event of their clashing with the teeth of the engine ring gear; and links connected to said abutments in a manner permitting change in the angular relationship between the abutments and the links and operable to draw the abutments axially towards each other upon relative rotary movement between the abutments and thereby reduce end pressure on the pinion teeth in the event of improper meshing.

JOHN W. FITZ GERALD.